Aug. 26, 1941.   F. GARCIA   2,254,141
COVERED VESSEL
Filed Sept. 29, 1938

Inventor
Francisco Garcia
By Walter W. Burns
Attorney

Patented Aug. 26, 1941

2,254,141

UNITED STATES PATENT OFFICE 2,254,141

COVERED VESSEL

Francisco Garcia, San Antonio, Tex.

Application September 29, 1938, Serial No. 232,421

1 Claim. (Cl. 220—47)

This invention relates to covered vessels and has particular relation to a covered pail which is well adapted for use as a milk pail.

In using unskilled labor, handling liquids which must from their nature be kept covered to prevent entry of foreign substances, difficulty has been experienced in keeping the vessels properly covered except when it is necessary to have them open. To guard against contamination, covers have been provided and the users have been cautioned to keep the covers in place except when the liquids are being put in or withdrawn therefrom. However, it has been found that constant supervision is necessary to bring about compliance with the instructions.

The primary object of this invention is the provision of an improved covered vessel.

Another object of the invention is the provision of a vessel having a hand-carrying means by which, when the vessel is lifted, the cover will be automatically applied to the vessel opening.

Still another object of the invention is the provision of a pail or bucket having an opening in its top with a connection between the cover and bail to close the opening when the bucket or pail is lifted with the bail.

Referring to the drawing wherein an embodiment of the invention is illustrated,

Similar reference characters refer to the same or similar parts throughout the specification and drawing.

Figure 1:
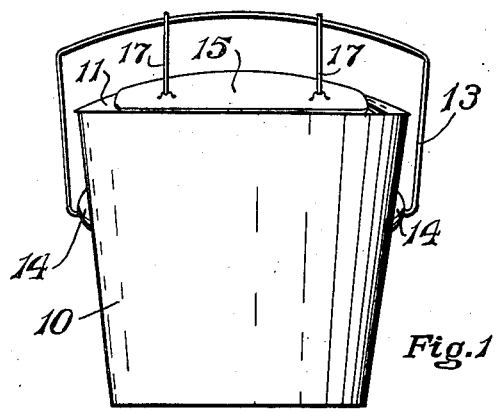
Fig. 1 is a front view of my invention with the opening closed.
Figure 2:
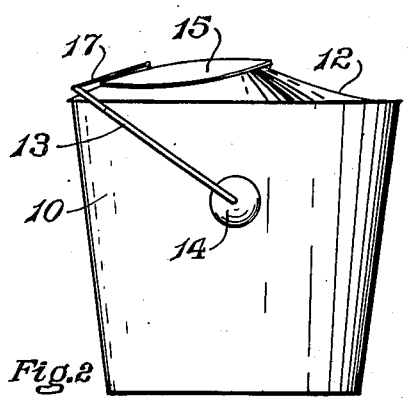
Figs. 2 and 3 are side views with the openings open and closed, respectively.
Figure 3:
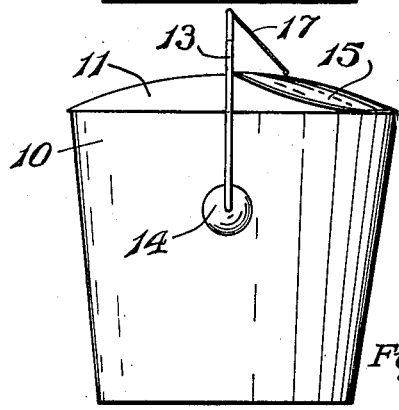
Figure 4:
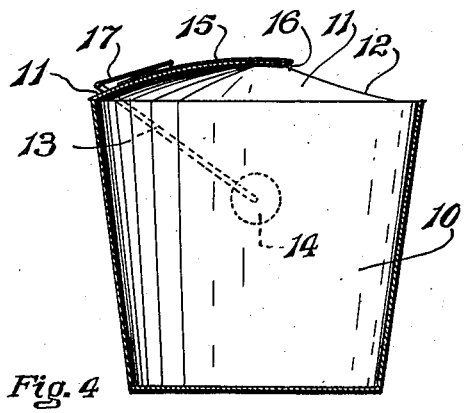
Fig. 4 is a view similar to Fig. 2 but in section.
Figure 5:
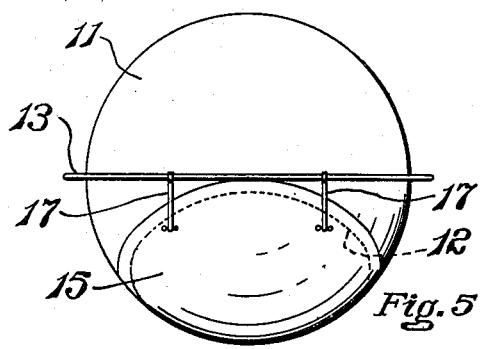
Figs. 5 and 6 are top plan views with the openings closed and open, respectively.
Figure 6:
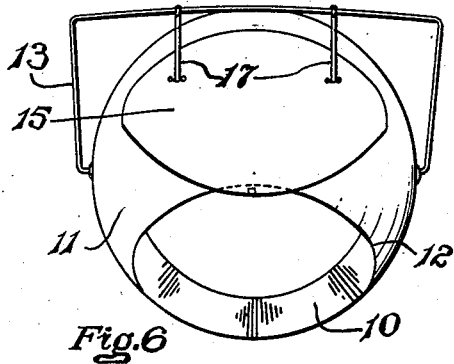
Figure 7:
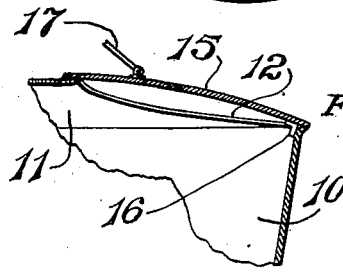
Fig. 7 is a fragmental sectional view showing the cover over the opening and the stop member for limiting the movement of the cover.

The present disclosure which illustrates this invention is that of a pail or bucket which is well adapted for use as a milk pail. In using milk pails, some of the unskilled labor of farms are unappreciative of the necessity of keeping the milk uncontaminated by foreign substances which may by carelessness get into the milk.

In carrying out this invention, there is provided a vessel having a body portion 10 having preferably a rounded top 11. This rounded top 11 is provided with an opening 12 for the entry and discharge of the liquids carried therein. This opening is preferably substantially elliptical in shape and extends from a point near the top or crown of the rounded top to a place adjacent the edge where the top joins the main body 10.

With this location of the opening there is no direct tendency for foreign substances particularly in liquid form, to enter the opening from the top when the vessel is in its upright position since the slope is always toward the periphery of the top from any point. This is particularly true if the edge of the opening is turned up slightly.

To lift the vessel, there is provided a bail or handle 13 which is hinged at 14 to the main body 10 at a sufficient distance below the rounded top, to permit its upper portion to be adjacent the outer edge of the top when the bail is in its inoperative position.

To close the opening 12, there is provided a moveable cover member 15 which in the present embodiment is operated slidably. This cover 15 is of a sufficiently large size to cover the opening 12 with a substantial margin of overlap. A projection 16 is provided on the underside of the cover to limit its movement as it moves to its operative position over the opening 12. This projection 16 is located so that when the cover reaches its limit of movement toward or at the edge of the top, it engages the edge of the opening 12 and serves as a stop.

Connecting the cover 15 and the bail or handle 13, are means provided to control the position of the cover 15. These connection means are here exemplified in the connecting links 17. These links 17 are of a sufficient length to cause the cover 15 to cover the opening 12 as the bail or handle 13 moves to its upper or carrying position. As the handle 13 reaches its upper position, the projection 16 is preferably in a position to be at or adjacent to the lower edge of the opening 12. These links 17 are preferably placed a sufficient distance from the center of the bail 13 that there is plenty of room for the hand of the operator between them.

In using the pail, as for example, in milking, the bail is moved to the rearward position. This movement through the links 17, causes the cover member 15 to be moved to uncover the opening 12. The parts are so proportioned so that preferably most of the edge of the opening is exposed, when the cover member is in its open position.

The projection 16 will then be at or near the upper side of the edge of the opening 12 and the bail 13 will be at or near the rear portion of the edge of the rounded top member 11. After the completion of the milking, the operator, by his act of lifting the pail with the bail, will also cause the links 17 to push the cover member to its closed position over the opening 12.

It will be clear from the foregoing description that there has been provided a vessel having a covered opening which opening becomes automatically closed as the carrying member is used to lift the vessel as in carrying.

While there has been illustrated and described in detail an embodiment of the invention, it is desired to have it understood that the disclosure is merely illustrative and that modifications and changes may be made without departing from the spirit of the invention and within its scope as claimed.

Having described my invention, what I claim is:

A vessel for liquids having a hand swinging bail means, a dome-shaped top of uniform curvature throughout, an opening in a portion of the top extending substantially from the center of the top to one of its edges, a cover for the opening conforming to the general shape of the dome-shaped top and having its inner surface of the same curvature as the curvature of the outer surface of the top, link means pivotally connected to the bail means and cover and of such a length that when the bail is in vertical position the cover will be held in closed position, the links extending downwardly and inclinedly from the bail when the latter is in vertical position, the cover being slidably mounted on the dome-shaped top to move along close to the surface of the top to uncover the opening when the bail moves out of vertical position to an angular position.

FRANCISCO GARCIA.